United States Patent [19]

Lob

[11] Patent Number: 5,489,254
[45] Date of Patent: Feb. 6, 1996

[54] THRUST BEARING FEATURE FOR SIDE PLATE OF BEARING BLOCK

[75] Inventor: Charles J. Lob, Oconomowoc, Wis.

[73] Assignee: Harken, Inc., Pewaukee, Wis.

[21] Appl. No.: 263,563

[22] Filed: Jun. 22, 1994

[51] Int. Cl.$^6$ ..................................................... F16C 19/49
[52] U.S. Cl. ........................... 384/454; 384/45; 384/547; 384/615
[58] Field of Search ..................................... 384/547, 609, 384/45, 454, 588, 615

[56] References Cited

U.S. PATENT DOCUMENTS

| | | | |
|---|---|---|---|
| 778,379 | 12/1904 | Slentz | 384/609 |
| 4,878,630 | 11/1989 | Schmid | 384/547 |
| 5,156,378 | 10/1992 | Harken et al. | 384/454 |

OTHER PUBLICATIONS

*Harken '94 Yacht Equipment* catalog, cover page and pp. 49–52, 1994.
*Lewmar Marine Equipment Power and Sail*, cover page and pp. 113–114, 1994.

Primary Examiner—Lenard A. Footland
Attorney, Agent, or Firm—Juettner Pyle Lloyd & Piontek

[57] ABSTRACT

A bearing block has a sheave rotatably mounted between a pair of side plates. A plurality of exposed ball bearings are mounted in the side plates for bearing engagement with the sides of the sheave. The ball bearings can circulate and are either provided in a circular groove or in arcs having a ball return channel connected between the ends of each arc. Location of thrust bearings in the side plates allows for reduction in mass of the sheave and increased space for main bearing capacity.

11 Claims, 2 Drawing Sheets

THRUST BEARING FEATURE FOR SIDE PLATE OF BEARING BLOCK

BACKGROUND OF THE INVENTION

Pulleys or bearing blocks are employed on a wide variety of sailing craft and are also used in various other applications, in order to change the direction of a moving line, or to provide a mechanical advantage in a tackle system.

A conventional pulley comprises a head having a swivel post for attachment to a support, a pair of side plates extending in parallel in a spaced relation from the head, and a sheave rotatably mounted between the side plates. The sheave has a continuous outer circumferential groove upon which a line is received.

Also, most conventional pulleys typically use some type of main bearing system to reduce rolling friction due to forces imposed by the line generally perpendicular to the axis of rotation of the sheave, generally referred to as radial loads. The bearings may include roller, ball or sleeve bearings. These bearings are usually disposed between a fixed inner race secured between the side plates and the outer rotatable sheave.

It is also known, especially in higher capacity blocks, to employ additional thrust bearings between the sides of the sheave and the side plates to prevent rubbing of the sheave against the side plates during rotation. For example, a circulation groove may be provided in the annular side surfaces of the sheave, and a plurality of ball bearings are loosely disposed in the grooves. Portions of the ball bearings project beyond the annular surface and can come into engagement with the side plates or other bearing surface secured to the inner race when thrust loads are imposed on the sheave.

The thrust bearings described above have several disadvantages. First, since the entire circumference of the groove is filled with ball bearings, the number of bearings employed may be very high in comparison to the expected load, and assembly and disassembly of the block can be very tedious. For example, when the block is disassembled to inspect or replace the main bearings, the thrust bearings tend to fall out and get lost.

Another drawback is that the material required to provide grooves in the sheave adds significant mass and radial thickness at the outer rim of the sheave. When bearing blocks are used on sailing vessels, it is important that the line engaged with the sheave should be capable of being released quickly, requiring rapid acceleration of the sheave. Since acceleration is inversely proportional to mass, any reduction of mass in the sheave would be greatly beneficial. Also, it would be desirable to decrease the radial thickness at the outer rim of the sheave in order to allow use of additional main bearings and increase load capacity.

SUMMARY OF THE INVENTION

In accordance with the present invention, the thrust bearings for the rotatable sheave of a pulley or bearing block are not carried by the sheave but by the inwardly facing surfaces or walls of the side plates. These side plate walls are provided with one or more continuous grooves containing exposed circulating ball bearings, which can bear against the annular side walls of the sheave as the sheave is rotating. Preferably, the groove or grooves for the ball bearings are undercut, with less than one-half of the ball surface being exposed, so that the balls do not fall out of the groove.

In a first embodiment, the groove in the side plate wall is circular and is filled with ball bearings, which can engage the annular side surface of the sheave. In this configuration, the bearings can rotate and can circulate in both rotary directions of the sheave.

In a second embodiment, the raceway is defined by a groove in the form of circular segment or arc with a ball return channel connected between the ends of the arc, and the groove and ball return channel being filled with ball bearings. In this embodiment, only the balls in the arc are engageable with the sheave, since the balls in the return channel are moving or circulating in an opposite direction. Two or more of these self-contained raceways are provided in the side plate to balance the axial or thrust loads on the sheave.

Since the thrust bearings are not carded by the sheave, the mass and radial thickness of the sheave are considerably reduced, thereby increasing the ability of the sheave to accelerate quickly. Also, because of a reduction of the radial thickness of the outer rim of the sheave, the radius for accommodation of the main bearings is increased, allowing use of additional main bearings and providing a higher load capacity.

DESCRIPTION OF THE PREFERRED EMBODIMENTS

Figure 1:
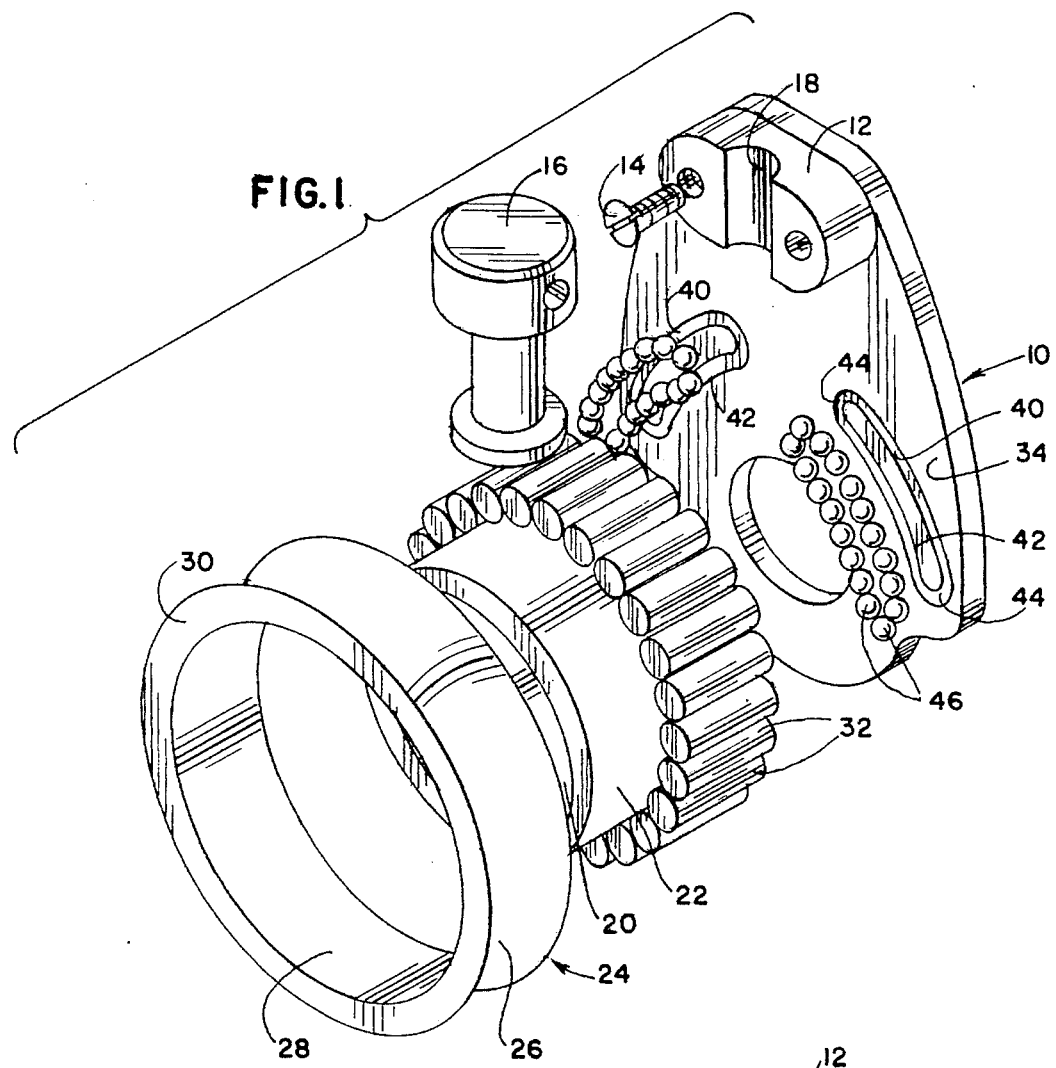
FIG. 1 is a perspective assembly view of a bearing block having the thrust bearing feature of the present invention, with one of the side plates being eliminated for the sake of clarity.

Features of a conventional bearing block are shown in FIG. 1. The block comprises a pair of spaced side plates, of which one is shown at 10. The ends of the side plates 10 are secured together at a head portion, comprising spacers 12, with the side plates being secured together through the spacers by bolts 14. A headpost 16 is rotatably mounted between concave surfaces 18 between the spacers, and the headpost is used to connect the block to a support in a conventional manner.

The block includes bearing means to reduce rolling friction and to carry radial loads. In the example shown, an inner race 20 is secured between the side plates and has an outwardly facing cylindrical race or bearing surface 22. A sheave 24 in the form of a ring is provided, said sheave having an outer rim with a circumferential groove 26 for receiving a flexible line or rope, and an inner cylindrical bearing surface 28, which upon assembly, is spaced from bearing surface 22 and concentric therewith. The sheave also has a pair of side annular surfaces 30.

In the embodiment shown, a plurality of roller bearings 32 are provided between the races 22 and 28. When assembled, the sheave can rotate around an axis of rotation on the bearings in both directions, and the main bearings 32 can circulate and rotate in both directions. Bearing blocks of this nature are conventional and are sold by Harken, Inc., located in Pewaukee, Wis. USA. Other types of main bearing systems are well known and may be employed in lieu of the roller bearings shown.

It may be seen in the embodiment shown in FIG. 1, that the sheave 24 can move sideways or axially on the bearings 32. Thus, it is generally desirable to provide anti-friction means between the sides 30 of the sheave and the inwardly facing surfaces 34 of the side plates 10.

In accordance with the first embodiment of the present invention, the inwardly facing flat and planar surface 34 of each side plate is provided at least two circulating sets of rotatable bearings, portions of which bearings are engageable with the annular side surfaces 30 of the sheave, in order to reduce friction between the sheave and the side plates when axial or thrust forces are imposed on the sheave.

As shown, each set of circulating thrust bearings comprises a continuous groove comprising a first bearing portion in the form of a circular segment or arc 40, a return portion 42, and rounded end portions 44 connecting the bering and return portions and providing a continuous ball circulation circuit. A plurality of contiguous ball bearings 46 are disposed in the continuous groove to substantially completely fill the same. The arc 40 is concentric with the axis of rotation of the sheave 24.

Figure 3:
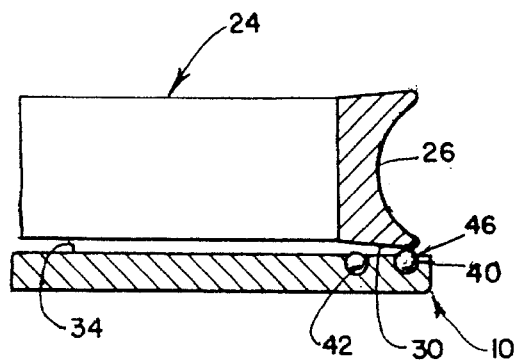
FIGS. 3 and 4 are sectional views through the thrust bearing portion of the block showing the relationship between the sheave and the thrust bearings and side plate.
Figure 4:
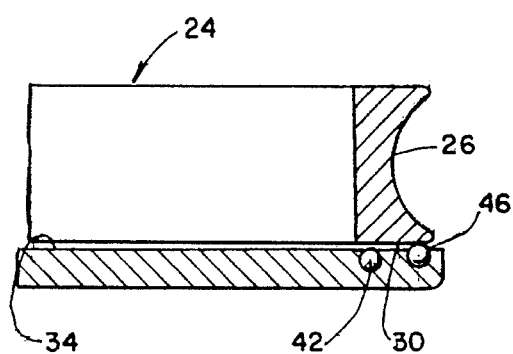

The total depth of the groove 40 is less than the diameter of the bearings 46 such that a portion of the bearings project beyond the inner surrounding flat wall 34 of the side plate 10, as shown in FIGS. 3 and 4. Also, as shown, the continuous grooves are preferably undercut and have a width at the opening thereof which is less than the width at the center of the groove, and the groove is preferably circular or semi-circular in cross section. After the bearings have been inserted in the groove, less than half of their diameter is exposed, thereby retaining the bearings and preventing them from falling out of the groove.

Figure 2:
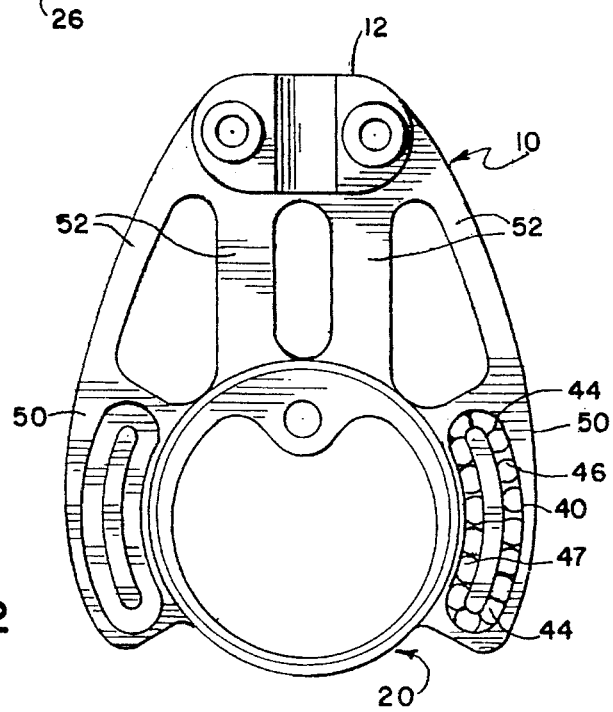
FIG. 2 is a plan view showing a side plate of a bearing block with the thrust bearing feature.

As shown in FIGS. 1 and 2, at least two opposed sets of ball races are utilized to equalize the bearing support for the sheave on each side, although three or more races could be employed in spaced sectors. In FIG. 1, the arcs 40 bisect approximately the 10 and 2 o'clock positions, and in FIG. 2, the arcs bisect the 3 and 9 o'clock positions. By necessity, each arc will extend less than 180 degrees around the axis of rotation. The ball return channel 42 can be straight or curved, provided no sharp angles are present to disrupt movement of the ball bearings.

The bearings 46 in the bearing grooves 40 are positioned to be engageable with the annular side surface 30 of the sheave, with the bearings in the ball return 42 being spaced from said side surface. This can be accomplished in various ways, as shown in FIGS. 3 and 4. In FIG. 3, the annular side surface 30 of the rotatable sheave 24 is tapered or sloped inwardly, such that the surface 30 is spaced from the balls in the return race 42 when said surface is engaged with the balls in the bearing race.

In FIG. 4, the same result is accomplished by making the groove 42 for the return race deeper than the bearing race 40, in which case, the surface 30 need not be tapered. Also, while the return race 42 is shown as being spaced inwardly from the bearing race, it could be spaced outwardly, or could be an internal conduit. Assuming that the sheave, for example, is rotating in the clockwise direction, the balls in the bearing race 40 will move or circulate in the clockwise direction, and the balls in the return groove 42 will circulate in the counterclockwise direction. The balls in the curved zones 44 will be gradually brought into bearing position as they roll and circulate around the races.

Preferably, at least the groove 40 is undercut in such a manner as to allow the balls 46 to be snap-fitted into the groove, with a segment of the balls being exposed to the sheave. Also, the balls are preferably formed from a polymer material to minimize corrosion and the need for lubrication. After the balls are installed in this fashion, preferably by snap-fitting, they are free to travel in the races but the undercut groove prevents the balls from falling out.

As shown in FIGS. 3 and 4, the arc-shaped race 40 is preferably located in opposition to the annular surface 30 near the outer periphery of the sheave 24 to provide maximum support for the rim of the sheave as it is rotating. Also, since the rim of the sheave does not contain a groove for thrust bearings, the radial wall thickness of the rim can be kept to a minimum, thereby increasing the radius for the roller bearings 32 and allowing the use of additional bearings.

In the embodiment shown in FIGS. 1–4, the side plates are designed to minimize material usage and to reduce weight without undue sacrifice of strength. For this reason, the side plates may not be coextensive with or entirely cover, all of the annular side walls of the sheave.

For example, as shown in FIG. 2, the side plate 10 is unitary with one half of the inner race 20, and the side plate terminates near the bottom of the inner race. The side plates include side portions 50 extending away from the inner race, with the inner race and side portions being connected by a plurality of spaced straps 52 to the head 12. The thrust ball loops are provided in the side portions 50 as shown.

Figure 5:
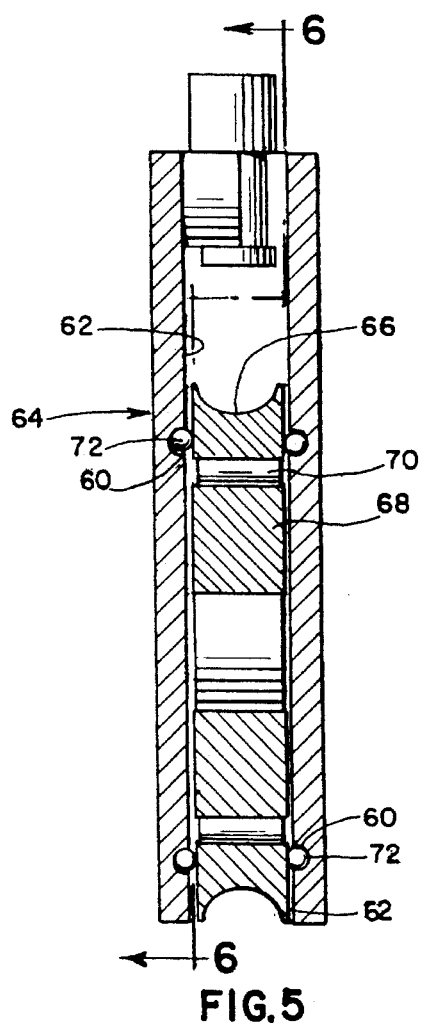
FIG. 5 is a side view of a bearing block having a circular thrust bearing race in the side plate in accordance with the present invention.
Figure 6:
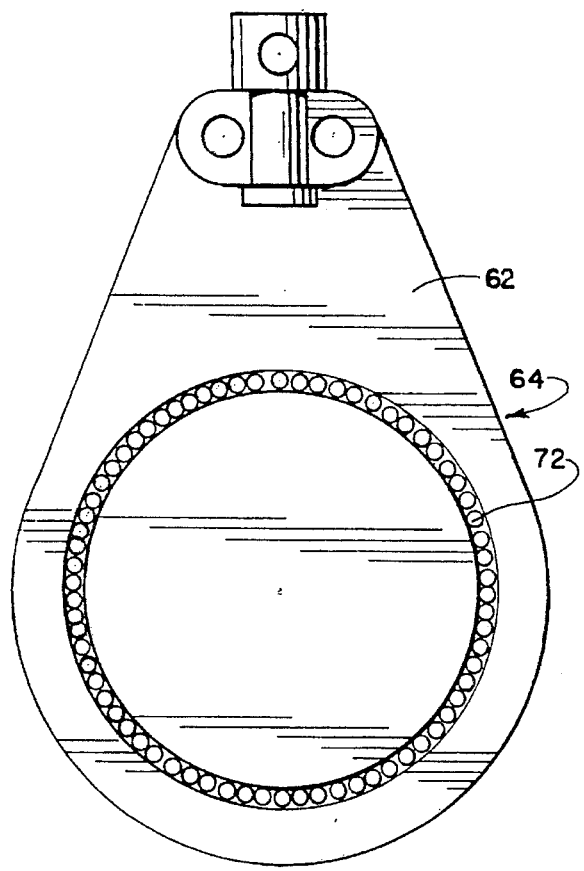
FIG. 6 is a plan view of one of the side plates shown in FIG. 5.

If the surface area or size of the side plates is not an important consideration, then the embodiment shown in FIGS. 5 and 6 may be employed. In this embodiment, the ball race is circular around the axis of rotation, and a ball return circuit in the opposite direction is not required.

Thus, the thrust bearing of FIGS. 5 and 6 comprises a continuous groove 60 disposed in the inner surface 62 of the side plate 64. The groove 60 is circular about the axis of rotation of the sheave 66, which is mounted for rotation about an inner race 68 on main roller bearings 70.

The circular race or groove 60 is preferably undercut and is filled with contiguous ball bearings 72, which can rotate and circulate in both rotary directions when contacted by the side of the rotating sheave 66.

I claim:

1. A bearing block having a thrust bearing, said bearing block comprising a pair of spaced side plates, said side plates having inwardly facing walls, a sheave mounted for rotation about an axis of rotation between said side plates, said sheave having annular side walls, a groove in each of said inwardly facing walls, a plurality of ball bearings in said grooves, and means for allowing circulation of said ball bearings in said grooves, at least a portion of said ball bearings being in bearing engagement with the annular side walls of the sheave.

2. The bearing block of claim 1 wherein said groove is circular and concentric about said axis of rotation.

3. The bearing block of claim 1 wherein said groove comprises an arc concentric with said axis of rotation, and a ball return conduit connected between the ends of the arc, said sheave being spaced from the ball bearings in said ball return conduit.

4. The bearing block of claim 1 wherein said groove is undercut and wherein less than half the diameter of the ball bearings project from the side plates.

5. A bearing block having thrust bearings, said bearing block comprising a pair of spaced side plates having inwardly facing surfaces, a circular sheave rotatably mounted about an axis of rotation between the side plates, said sheave having an annular side surface facing one of the inwardly facing surfaces of said side plates, and a pair of spaced thrust bearing races in said one inwardly facing surface, said races comprising a groove in the form of an arc in opposition to the annular side surface of the sheave, bearing return means for providing a bearing return circuit between the ends of the arc, and a plurality of ball bearings in said groove and said bearing return means, the ball bearings in said groove projecting about said one inwardly facing surface and being engageable with said annular side surface, with said ball bearings circulating in said groove and said bearing return means.

6. The bearing block of claim 5 wherein said arc is concentric with the axis of rotation of the sheave.

7. The bearing block of claim 5 wherein said arc and said bearing return means comprise a continuous groove, and wherein the annular side surfaces of said sheave are spaced from the ball bearings in the groove comprising the bearing return means.

8. The bearing block of claim 7 wherein said groove of the bearing return means is spaced inwardly from the arc, and wherein the annular side surfaces of said sheave are tapered inwardly.

9. A bearing block having thrust bearings, said bearing block comprising a pair of spaced side plates having inwardly facing walls, a sheave mounted for rotation about an axis of rotation between said side plates, said sheave having a pair of annular side surfaces, a circular groove in the inwardly facing wall of each side plate in opposition to said annular side surfaces and a plurality of ball bearings disposed in each groove and projecting above the inwardly facing walls of said side plates, said ball bearings being rotatable and capable of circulation around said groove.

10. The bearing block of claim 9 wherein said groove is undercut and said ball bearings are snap-fitted into said groove.

11. A bearing block comprising a pair of side plates having inwardly facing planar walls, an inner bearing race secured between said side plates, a sheave rotatably mounted around said inner race, said sheave being ring-shaped and comprising a groove around the outer periphery, a pair of annular side walls, and an inner wall defining an outer bering race spaced from said inner race, a plurality of roller bearings between said inner and outer races, and a plurality of exposed ball bearings carried by said inwardly facing walls and being engageable with the annular walls of the sheave.

* * * * *